United States Patent
Song et al.

(10) Patent No.: US 9,853,487 B2
(45) Date of Patent: Dec. 26, 2017

(54) MAGNETIC FIELD SHIELDING SHEET AND WIRELESS POWER CHARGING APPARATUS INCLUDING THE SAME

(71) Applicant: SAMSUNG ELECTRO-MECHANICS CO., LTD., Suwon-si (KR)

(72) Inventors: Yeong Hwan Song, Suwon-si (KR); Hyun Jung Lee, Suwon-si (KR); Jae Hyuk Jang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 15/176,888

(22) Filed: Jun. 8, 2016

(65) Prior Publication Data
US 2017/0104358 A1  Apr. 13, 2017

(30) Foreign Application Priority Data
Oct. 13, 2015 (KR) .................. 10-2015-0142838

(51) Int. Cl.
| | |
|---|---|
| *H02J 7/02* | (2016.01) |
| *H01F 27/22* | (2006.01) |
| *H01F 27/08* | (2006.01) |
| *H01F 27/36* | (2006.01) |
| *H01F 38/14* | (2006.01) |

(52) U.S. Cl.
CPC .............. *H02J 7/025* (2013.01); *H01F 27/08* (2013.01); *H01F 27/22* (2013.01); *H01F 27/365* (2013.01); *H01F 38/14* (2013.01)

(58) Field of Classification Search
None
See application file for complete search history.

(56) References Cited

U.S. PATENT DOCUMENTS

| | | | | |
|---|---|---|---|---|
| 6,037,400 | A * | 3/2000 | Kitahata | C08K 3/04 524/495 |
| 6,136,429 | A * | 10/2000 | Saito | H05K 9/0015 428/212 |
| 8,864,748 | B2 * | 10/2014 | Coulthard | A61M 1/0088 602/42 |
| 9,252,611 | B2 * | 2/2016 | Lee | H01F 38/14 |
| 9,392,735 | B2 * | 7/2016 | Jang | B32B 27/08 |
| 9,507,390 | B2 * | 11/2016 | Jang | H05K 9/0075 |

(Continued)

FOREIGN PATENT DOCUMENTS

| | | |
|---|---|---|
| KR | 10-2014-0113226 A | 9/2014 |
| KR | 10-2014-0121663 A | 10/2014 |

(Continued)

OTHER PUBLICATIONS

Derwent Abstract Translation of WO 2014/137151 A1 (pub. 2014).*

*Primary Examiner* — Kevin M Bernatz
(74) *Attorney, Agent, or Firm* — NSIP Law (57) ABSTRACT

A magnetic field shielding sheet and a wireless power charging apparatus including the same are provided. A magnetic field shielding sheet includes a magnetic field shielding area including magnetic field shielding layers disposed on a surface of a coil part configured to provide a wireless power charging function to shield a magnetic field generated from the coil part and an adhesive layer bonding the magnetic field shielding layers to each other, and heat radiation fillers disposed within the adhesive layer.

16 Claims, 6 Drawing Sheets

(56) References Cited

U.S. PATENT DOCUMENTS

| | | | | |
|---|---|---|---|---|
| 2005/0062024 A1* | 3/2005 | Bessette | ............... | B82Y 30/00 252/500 |
| 2007/0031995 A1* | 2/2007 | Kaneko | ............... | H01L 24/12 438/119 |
| 2008/0085426 A1* | 4/2008 | Kurita | ............... | G11B 5/66 428/828.1 |
| 2009/0059489 A1* | 3/2009 | Yoo | ............... | H05K 9/0096 361/679.21 |
| 2009/0096996 A1* | 4/2009 | Kim | ............... | G03B 21/16 353/52 |
| 2011/0186324 A1* | 8/2011 | Hur | ............... | H05K 9/0098 174/34 |
| 2012/0057322 A1* | 3/2012 | Waffenschmidt | ..... | H01F 27/365 361/816 |
| 2013/0114165 A1* | 5/2013 | Mosendz | ............... | G11B 5/65 360/244 |
| 2013/0240261 A1* | 9/2013 | Song | ............... | H05K 9/0075 174/391 |
| 2014/0070763 A1* | 3/2014 | Chiles | ............... | H01F 38/14 320/108 |
| 2014/0167522 A1* | 6/2014 | Lee | ............... | H01F 38/14 307/104 |
| 2014/0216807 A1* | 8/2014 | Liu | ............... | H05K 9/0088 174/358 |
| 2014/0306653 A1* | 10/2014 | Hirobe | ............... | H01F 38/14 320/108 |
| 2015/0123860 A1* | 5/2015 | Park | ............... | H01Q 1/22 343/720 |
| 2016/0057900 A1* | 2/2016 | Polak | ............... | H01F 27/365 320/108 |
| 2016/0064814 A1* | 3/2016 | Jang | ............... | H01Q 1/526 343/842 |
| 2016/0372975 A1* | 12/2016 | Jang | ............... | H02J 50/10 |
| 2017/0040830 A1* | 2/2017 | Jang | ............... | H02J 7/025 |
| 2017/0053737 A1* | 2/2017 | Kurs | ............... | H03H 7/40 |
| 2017/0112026 A1* | 4/2017 | Yu | ............... | H05K 9/0081 |

FOREIGN PATENT DOCUMENTS

| | | |
|---|---|---|
| KR | 10-2014-0139783 A | 12/2014 |
| KR | 10-2015-0005075 A | 1/2015 |
| KR | 10-2015-0005755 A | 1/2015 |

\* cited by examiner

MAGNETIC FIELD SHIELDING SHEET AND WIRELESS POWER CHARGING APPARATUS INCLUDING THE SAME

CROSS-REFERENCE TO RELATED APPLICATION

This application claims the benefit under 35 USC 119(a) of Korean Patent Application No. 10-2015-0142838 filed on Oct. 13, 2015, in the Korean Intellectual Property Office, the entire disclosure of which is incorporated herein by reference for all purposes.

BACKGROUND

1. Field

The following description relates to a magnetic shielding sheet and a wireless power charging apparatus including the same.

2. Description of Related Art

As various mobile devices such as a smartphones or tablet PCs are becoming more popular, a system capable of wirelessly charging secondary cell batteries inside mobile devices in a contactless manner is being actively researched. A wireless power charging system generally includes a wireless power transmitting apparatus that transmits power and a wireless power receiving apparatus that receives and stores power.

A wireless power charging system may utilize a method of transmitting and receiving power induced by applying an electrical signal to a coil part. For this purpose, the wireless power transmitting apparatus and the wireless power receiving apparatus generally include coil parts. For example, a coil part may be embedded in a mobile device charged by a wireless power charging system, and another coil part may be embedded in a wireless power transmitting apparatus such as a cradle provided as an accessory to the mobile device. Further, a magnetic field shielding sheet that may minimize the effect of a magnetic field generated during a wireless power transmission on various electronic components included in a device to be charged, other external electronics, or a human body is being researched.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a magnetic field shielding sheet includes a magnetic field shielding area including magnetic field shielding layers disposed on a surface of a coil part configured to provide a wireless power charging function to shield a magnetic field generated from the coil part and an adhesive layer bonding the magnetic field shielding layers to each other, and heat radiation fillers disposed within the adhesive layer.

A volume ratio taken up by the heat radiation fillers within the adhesive layer may range from 0.05 to 0.8.

A volume ratio of the heat radiation fillers within a first portion of the adhesive layer distal from the coil part may be larger than a volume ratio of the heat radiation fillers within a second portion of the adhesive layer closer to the coil part than the first portion.

A volume ratio of the heat radiation fillers within a first portion of the adhesive layer adjacent to the coil part may be larger than a volume ratio of the heat radiation fillers within a second portion of the adhesive layer farther away from the coil part than the first portion.

A diameter of each of the heat radiation fillers may range from 0.05 µm to 10 µm.

The general aspect of the magnetic field shielding sheet may further include a heat radiation layer disposed on at least one of an upper surface and a lower surface of the magnetic field shielding area.

The heat radiation layer may include different materials from the adhesive layer.

At least a portion of the heat radiation fillers may be disposed within the heat radiation layer.

The heat radiation filler may include at least one selected from the group consisting of graphite, graphene, alumina, aluminum nitride, boron nitride, magnesium oxide, silicon carbide, and silicon nitride.

The magnetic field shielding layers may include at least one selected from the group consisting of ferrite, an amorphous metal ribbon, a nano-crystalline ribbon, and a metal polymer sheet.

The magnetic field shielding sheets may be split into a plurality of pieces, and the adhesive layer may be disposed between at least a portion of the plurality of pieces.

In another general aspect, a wireless power charging apparatus includes a coil part including a first surface on which a conductive pattern is disposed and a second surface opposing the first surface, a power circuit configured to charge a secondary cell battery by using power induced into the coil part, a magnetic field shielding area including magnetic field shielding layers disposed on the second surface to absorb a magnetic field generated from the conductive pattern and an adhesive layer bonding the magnetic field shielding layers to each other, and heat radiation fillers disposed within the adhesive layer.

A volume ratio taken up by the heat radiation fillers within the adhesive layer may range from 0.05 to 0.8.

A volume ratio of the heat radiation fillers within a first portion of the adhesive layer distal from the coil part may be larger than a volume ratio of the heat radiation fillers within a second portion of the adhesive layer closer to the coil part than the first portion.

A volume ratio of the heat radiation fillers within a first portion of the adhesive layer adjacent to the coil part may be larger than a volume ratio of the heat radiation fillers within a second portion of the adhesive layer farther away from the coil part than the first portion.

The general aspect of the wireless power charging apparatus may further include a heat radiation layer disposed between the coil part and the magnetic field shielding area, wherein a thickness of the heat radiation layer may range from 25% to 200% of that of at least one of the magnetic field shielding layers.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Throughout the specification, it is to be understood that when an element, such as a layer, region or substrate, is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, other elements or layers intervening cannot be present. Like numerals refer to like elements throughout. As used herein, the term "and/or" includes any and all combinations of one or more of the associated listed items.

Although terms such as "first," "second," "third," may be used herein to describe various members, components, regions, layers and/or sections, these members, components, regions, layers, or sections are not to be limited by these terms. These terms are only used to distinguish one member, component, region, layer or section from another member, component, region, layer or section. Thus, a first member, component, region, layer or section discussed in embodiments below may also be termed a second member, component, region, layer or section without departing from the teachings of the embodiments.

Spatially relative terms, such as "above," "upper," "below," and "lower" and the like, may be used herein for ease of description to describe one element's relationship to one or more other elements as shown in the figures. It is to be understood that the spatially relative terms are intended to encompass different orientations of the device in use or operation in addition to the orientation depicted in the figures. For example, if the device in the figures is turned over, elements described as being "above" another element or being an "upper" element will then be "below" the other element or will be a "lower" element. Thus, the term "above" can encompass both the above and below orientations depending on a particular direction of the figures. The device may also be oriented in other ways (for example, rotated 90 degrees or at other orientations) and the spatially relative descriptors used herein are to be interpreted accordingly.

The terminology used herein is for describing various examples only and is not to be used to limit the present disclosure. As used herein, the singular terms "a," "an," and "the" are intended to include the plural forms as well, unless the context clearly indicates otherwise. Further, as used herein, the terms "include," "comprises," and "have" specify the presence of stated features, numbers, operations, members, elements, and/or combinations thereof, but do not preclude the presence or addition of one or more other features, operations, members, elements, and/or combinations thereof.

Hereinafter, examples will be described with reference to schematic diagrams. In the drawings, due to manufacturing techniques and/or tolerances, for example, modifications of the shape shown may be estimated. Thus, the examples described herein are not to be construed as being limited to the particular shapes of regions shown herein, but are to be construed as including changes in shape that occur during manufacturing. The features of the examples described herein may be combined in various ways as will be apparent to one of ordinary skill in the art. Further, although the examples described below have a variety of configurations, other configurations are possible as will be apparent to one of ordinary skill in the art.

Figure 1:
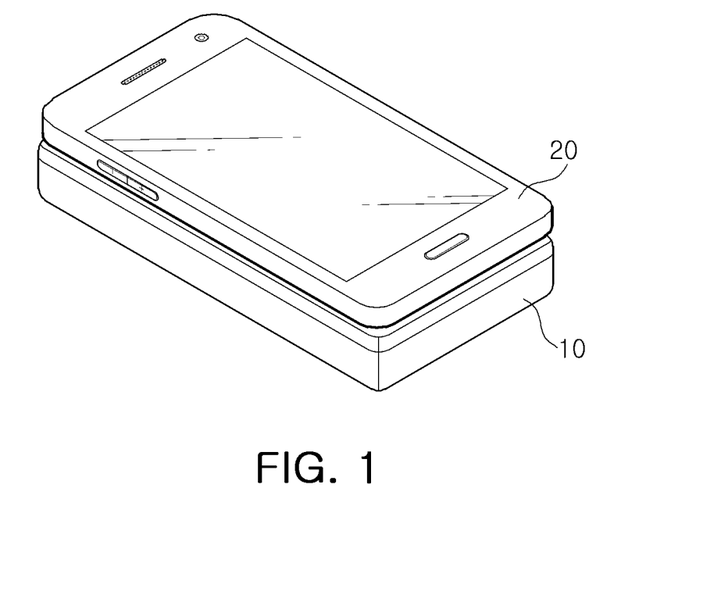
FIGS. 1 and 2 are diagrams illustrating an operation of an example of a wireless power charging system according to the present description.
Figure 2:
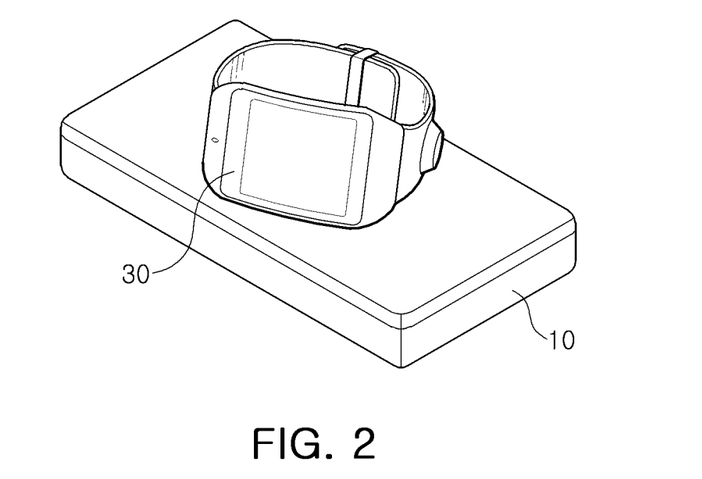

FIGS. 1 and 2 are diagrams illustrating an operation of an example of a wireless power charging apparatus that includes a magnetic field shielding sheet according to the present description.

According to an example of the present description, a magnetic field shielding sheet having excellent heat radiation efficiency may be obtained and be disposed in a wireless power charging apparatus.

Referring to FIGS. 1 and 2, a wireless power charging system according to an example includes a wireless power transmitting apparatus 10 and devices to be charged 20 and 30 in contact with the wireless power transmitting apparatus 10 to be charged wirelessly. In the example shown in FIGS. 1 and 2, the devices to be charged 20 and 30 may be a mobile device such as a smartphone or a wearable device such as a smart watch. In addition, the devices to be charged 20 and 30 may include various electronics including a wireless power receiving apparatus.

When power is supplied to the wireless power transmitting apparatus 10, a transmission coil part included in the wireless power transmitting apparatus 10 may generate a magnetic field. The devices to be charged 20 and 30 may include a re-chargeable secondary cell battery, a receiving coil part, a power circuit connected between the receiving coil part and the secondary cell battery, or the like. Meanwhile, power may be generated from the receiving coil part due to the magnetic field generated from the transmitting coil part. The power circuit may charge the secondary cell battery using the power generated from the receiving coil part.

In the wireless power charging system according to the example shown in FIGS. 1 and 2, when secondary cell batteries inside the devices to be charged 20 and 30 are being charged, the magnetic field generated from the transmitting coil part of the wireless power transmitting apparatus 10 and the magnetic field induced into the receiving coil part from the transmitting coil part may have an effect on electronic components such as an application processor (AP) of the devices to be charged 20 and 30, memories and image sensors inside the devices to be charged 20 and 30, electronics other than the devices to be charged 20 and 30, a human body, or the like. In order to minimize the effect of the magnetic fields generated from the transmitting coil part and the receiving coil part on the electronic components of the devices to be charged 20 and 30, electronics other than the devices to be charged 20 and 30, the human body, or the like, the wireless power transmitting apparatus 10 and the devices to be charged 20 and 30 may include a magnetic field shielding sheet.

The magnetic field shielding sheet may be disposed on at least one surface of the transmitting coil part and the receiving coil part to shield at least a portion of the magnetic field generated from the transmitting coil part and the receiving coil part. To effectively shield the magnetic fields, the magnetic field shielding sheet may include one or more magnetic field shield layers. When the plurality of magnetic field shielding layers are included in the magnetic field shielding sheet, the plurality of magnetic field shielding layers may each be stacked with each other. To prevent a space through which the magnetic fields may be transmitted from being formed on one surface of the transmitting coil part or the receiving coil part, at least some of the plurality of magnetic field shielding layers stacked with each other may have an overlapping area with each other.

Meanwhile, the magnetic field shielding sheet according to this example may include a heat radiation filler in addition to the magnetic field shielding layer. The heat radiation filler may be formed of graphite, graphene, alumina, aluminum nitride, boron nitride, magnesium oxide, silicon carbide, silicon nitride, or the like. Meanwhile, a heat radiation path may be disposed within the magnetic field shielding sheet to improve the heat radiation efficiency. The heat radiation filler may be included in the magnetic field shielding sheet while being mixed with an epoxy-based adhesive, an acrylic adhesive, or the like that may bond the plurality of magnetic field shielding sheets to each other.

Figure 3:
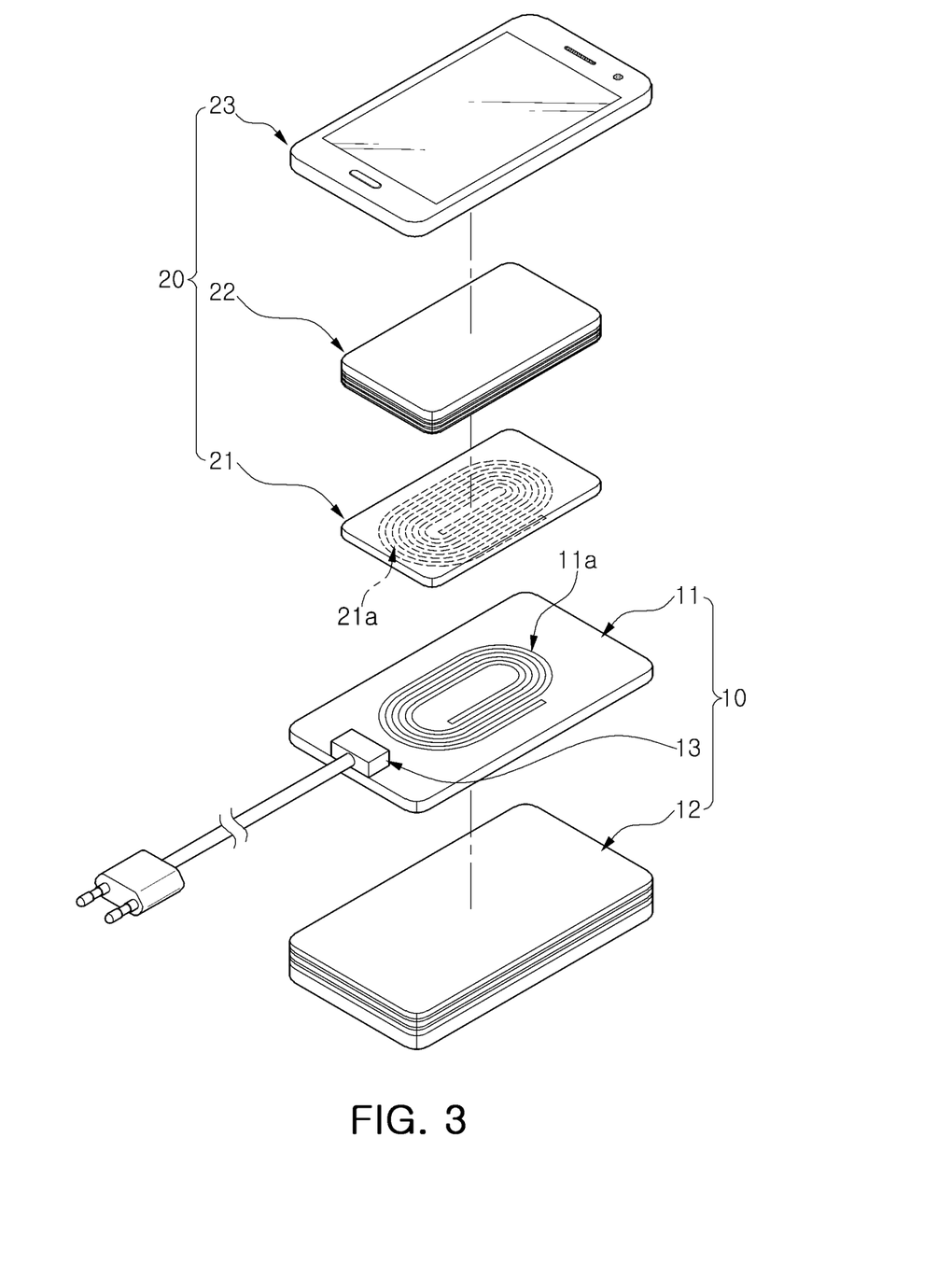
FIG. 3 is an exploded perspective view of an example of a wireless power charging apparatus including a magnetic field shielding sheet.

FIG. 3 is an exploded perspective view of an example of a wireless power charging apparatus including a magnetic field shielding sheet according to the present description.

Referring to FIG. 3, magnetic field shielding sheets 12 and 22 are included in a wireless power transmitting apparatus 10 and a device to be charged 20, respectively. The wireless power transmitting apparatus 10 uses the magnetic field generated from a conductive pattern 11a of the transmitting coil part 11 to wirelessly transmit power to the device to be charged 20, and the magnetic field generated from the transmitting coil part 11 is transmitted upwards to the device to be charged 20. Therefore, to prevent the wireless power transmitting function from being hindered, the magnetic field shielding sheet 12 is disposed on an opposite surface to a surface on which the conductive pattern 11a of the transmitting coil part 11 is formed, that is, on a lower surface of the transmitting coil part 11 in FIG. 3.

The magnetic field shielding sheet 12 is disposed beneath the transmitting coil part 11 to considerably reduce the magnetic field generated from the transmitting coil part 11 emitted in other directions, not in the upper direction of the transmitting coil part 11 in which the device to be charged 20 is positioned. Therefore, the effect of the magnetic field generated from the transmitting coil part 11 may be reduced on electronics other than the device to be charged 20 and on the human body.

Meanwhile, the device 20 to be charged also includes the magnetic field shielding sheet 22. To prevent the wireless power receiving function of the receiving coil part 21 from being hindered, the magnetic field shielding sheet 22 included in the device to be charged 20 may be disposed on an opposite surface to a surface on which the conductive pattern 21a of the receiving coil part 21 is formed, that is, on an upper surface of the receiving coil part 21 in FIG. 3. The magnetic field shielding sheet 22 may considerably reduce the effect on other electronic components of the device to be charged 20 due to the emission of the magnetic field induced into the receiving coil part 21 to the upper portion of the receiving coil part 21. Further, the magnetic field induced into the receiving coil part 21 may be emitted externally, and as a result, the effect on other electronics, the human body, or the like may be considerably minimized.

Figure 4:
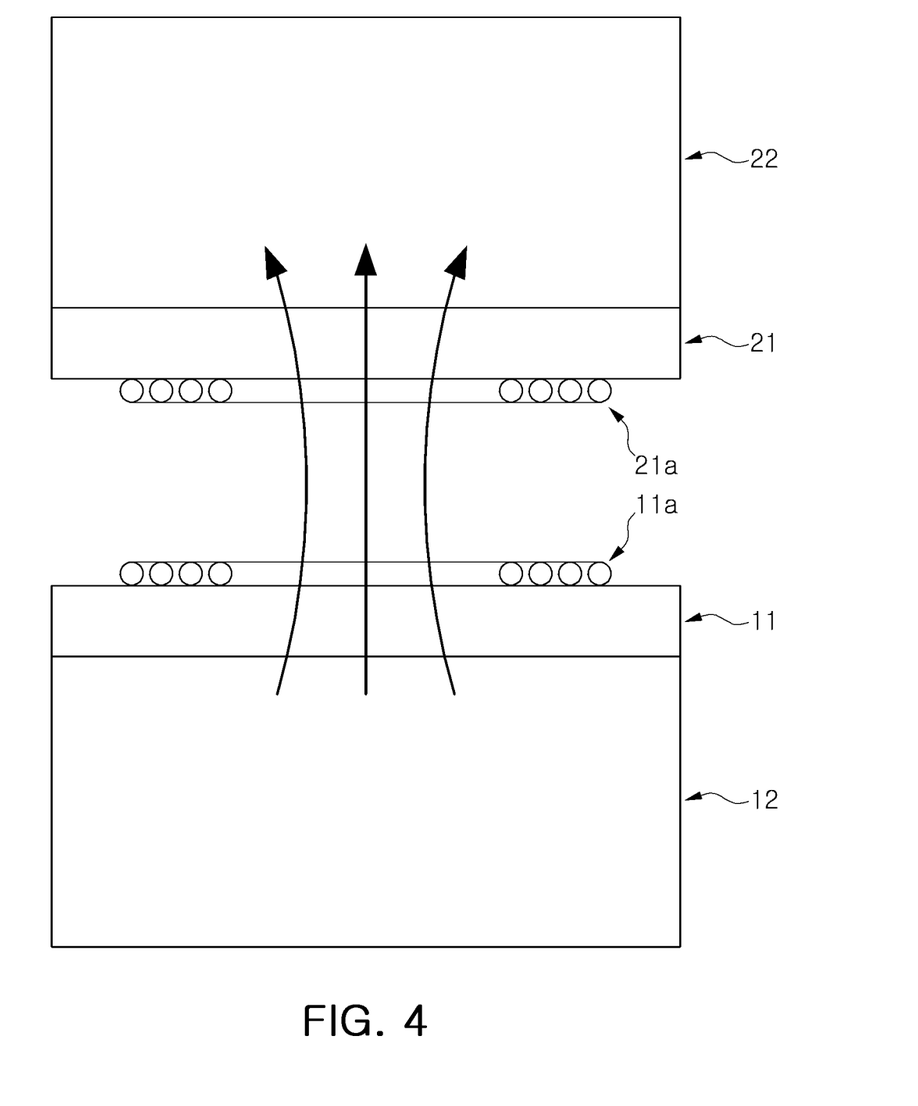
FIG. 4 is a diagram illustrating a function of an example of a magnetic field shielding sheet according to the present description.

FIG. 4 is a diagram illustrating a function of an example of a magnetic field shielding sheet according to the present description.

Referring to FIG. 4, the magnetic field shielding sheets 12 and 22 may be disposed at the wireless power transmitting side and the wireless power receiving side, respectively. Meanwhile, the wireless power transmitting side and the wireless power receiving side may each have the transmitting coil part 11 and the receiving coil part 21, and the conductive patterns 11a and 21a may be disposed on one surface of the transmitting coil part 11 and on one surface of the receiving coil part 21, respectively.

When a predetermined electrical signal is applied to the conductive pattern 11a of the transmitting coil part 11, a magnetic field is generated in the transmitting coil part 11. The magnetic field of the transmitting coil part 11 is emitted from the transmitting coil part 11 externally and an induced magnetic field may be generated in the conductive pattern 21a of the receiving coil part 21 disposed adjacent to the transmitting coil part 11 by a magnetic induction phenomenon. Power may be generated by the receiving coil part 21 due to an induced magnetic field generated in the receiving coil part 21, and the power circuit of the wireless power receiving side may use the power generated by the receiving coil part 21 to charge a secondary battery.

At the wireless power receiving side, a magnetic field shielding sheet 22 is disposed on one surface of the receiving coil part 21 on which the conductive pattern 21a is not formed, that is, on the upper surface of the receiving coil part 21 in the example shown in FIG. 4. The magnetic field shielding sheet 22 may be disposed to reduce the effect of the induced magnetic field generated from the receiving coil part 21 or the magnetic field transferred from the transmitting coil part 11 on the electronic components of the device to be charged 20 and may considerably reduce the effect by the magnetic field transferred from the transmitting coil part 11 for wireless power charging efficiency. Therefore, the magnetic field shielding sheet 22 is positioned on the upper surface of the receiving coil part 21 on which the conductive pattern 21a is not formed.

FIGS. 5 through 9 are cross-sectional views showing a structure of an example of a magnetic field shielding sheet according to the present description. Magnetic field shielding sheets 100 through 500 according to the examples shown in FIGS. 5 through 9 may be used as a magnetic field shielding sheet disposed in the devices to be charged 20 and 30. The magnetic field shielding sheets may also be applied to a wireless power transmitting apparatus 10. Further, the examples described with reference to FIGS. 5 through 9, respectively, may be cross-applied with other examples described in the present description.

Figure 5:
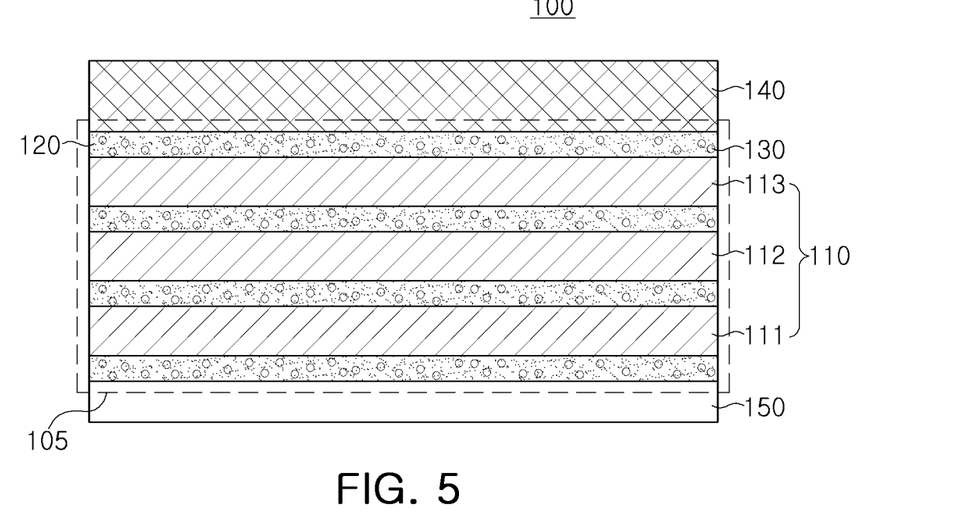
FIGS. 5 through 9 are cross-sectional views illustrating a structure of an example of a magnetic field shielding sheet according to the present description.

Referring to FIG. 5, the magnetic field shielding sheet 100 according to the illustrated example includes a plurality of magnetic field shielding layers 111 through 113 (110) including an Fe—Si-based alloy, amorphous metal, a nano-crystalline ribbon, or the like and an adhesive layer 120 bonding the plurality of magnetic field shielding layers 110 to each other. Adhesive layers 120 are disposed between the plurality of magnetic field shielding layers 110 and bond the plurality of magnetic field shielding layers 110 to each other to provide the magnetic field shielding area 105. A lower adhesive layer 150 for bonding the coil part to the magnetic field shielding sheet 100 is disposed at a lower portion of the magnetic field shielding area 105, and a protective layer 140 formed of a material having high heat conductivity is also disposed at an upper portion of the magnetic field shielding area to increase the heat radiation efficiency.

The adhesive layers 120 bonding the plurality of magnetic field shielding layers 110 to each other may include an epoxy-based adhesive or an acrylic adhesive. The heat radiation filler 130 is included in the adhesive layers 120. The heat radiation filler 130 may include at least one of materials such as graphene, graphite, alumina, aluminum nitride, boron nitride, and silicon nitride, or the like. The heat radiation filler 130 may increase the heat radiation efficiency along a direction in which the plurality of magnetic field shielding layers 110 and the plurality of adhesive layers 120 are stacked.

A volume ratio taken up by the heat radiation filler 130 within the adhesive layer 120 may range from 0.05 to 0.8. If the volume ratio taken up by the heat radiation filler 130 within the adhesive layer 120 is below 0.05, the heat radiation efficiency may not be obtained as desired. Further, if the heat radiation filler 130 is excessively included in the adhesive layer 120, it may be difficult to uniformly distribute the heat radiation filler 130 within the adhesive layer 120, and the moldability of the adhesive layer 120 may deteriorate, or the like.

In the operation of transmitting and receiving wireless power such as supplying power to the transmitting coil part to generate the magnetic field and inducing the magnetic field into the receiving coil part, the heat generated from the coil part may reduce the wireless power charging efficiency. In the present description, the magnetic field shielding sheet 100 may simultaneously perform both the magnetic field shielding function and the heat radiation function by allowing the magnetic field shielding sheet 100 to include the heat radiation filler 130, thereby preventing the wireless power charging efficiency from being reduced due to the heat generated upon the wireless power charging operation.

Figure 6:
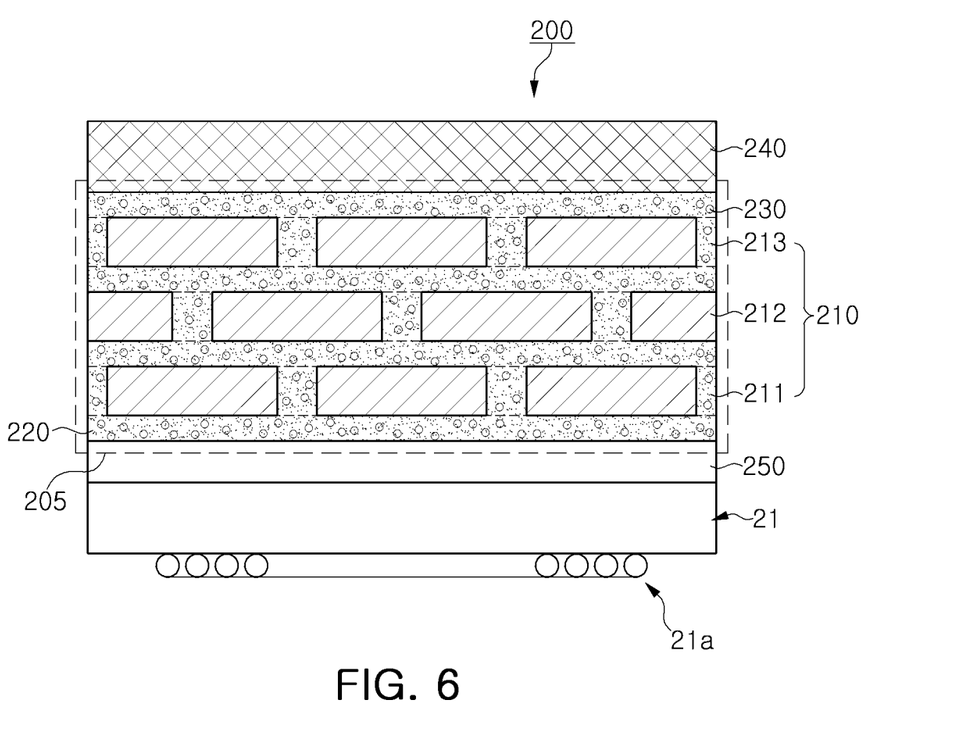

Next, referring to FIG. 6, a magnetic field shielding sheet 200 according to an example is attached to a coil part 21. The coil part 21 shown in the example of FIG. 6 may be a receiving coil part included in a device to be charged 20. The magnetic field shielding sheet 200 may be attached to the upper surface of the coil part 21, and the transmitting coil part 11 of the wireless power transmitting apparatus 10 may be disposed adjacent to the lower surface of the coil part 21 on which the conductive pattern 21a is disposed.

In the example shown in FIG. 6, magnetic field shielding layers 211 through 213 (210) are split into a plurality of pieces within the magnetic field shielding sheet 200, and the adhesive layer 220 is disposed between the plurality of pieces. The adhesive layer 220 may be bonded to the magnetic field shielding layer 210 split into the plurality of pieces to provide the magnetic field shielding area 205.

At least some of spaces between the plurality of pieces may overlap with other pieces. Therefore, the magnetic field generated from the coil part 21 may be shielded without being transferred up to the upper surface of the magnetic field shielding sheet 200. Further, the magnetic field shielding layer 210 may be split into the plurality of pieces to thereby further reduce permeability and reduce a loss of eddy current.

Meanwhile, the adhesive layer 220 may include an epoxy-based adhesive or an acrylic adhesive, and the epoxy-based adhesive or the acrylic adhesive with which the plurality of heat radiation fillers 230 are mixed may be disposed. The heat radiation filler 230 may be formed of graphene, graphite, alumina, metal nitride, silicon nitride, or the like, and may be a particle having a diameter of about 0.05 μm to 10 μm. If the diameter of the heat radiation filler 230 is excessively small, the moldability of the adhesive layer 220 may deteriorate, and if the diameter of the heat radiation filler 230 is excessively large, a difference in thermal expansion rate between the adhesive layer 220 and the magnetic field shielding layer 210 may be increased, and therefore the reliability of the magnetic field shielding sheet 200 may be reduced.

The heat radiation filler 230 is disposed in the magnetic field shielding layers 210 split into a plurality of pieces to provide the heat radiation path to which the heat generated from the coil part 21 may be transferred. The heat generated from the coil part 21 may be transferred toward the upper surface of the magnetic field shielding sheet 200 through the heat radiation filler 230 disposed between the plurality of pieces split in the stacked direction at the same layer.

A heat radiation layer 240 is disposed at the upper portion of the magnetic field shielding sheet 200, and a double-sided tape 250 may be disposed at lower portion thereof. The heat radiation layer 240 may be a thermally conductive tape, and may be at least one of a thermally conductive silicon sheet, an acrylic adhesive, and a graphite sheet. Meanwhile, the double-sided tape 250 may be a member for bonding the magnetic field shielding sheet 200 to the coil part 21, and may have a thickness of about 25% to 200% based on a thickness of the magnetic field shielding layer 210 disposed within the magnetic field shielding sheet 200. The thickness of the double-sided tape 250 may have a thickness as described above to secure the bonding reliability and the strength property of the magnetic field shielding sheet 200 with the coil part 21. For example, when the thickness of the double-sided tape 250 is equal to or less than 50% of the thickness of the magnetic field shielding layer 210, a separate support member for securing the strength property may be additionally provided.

Figure 7:
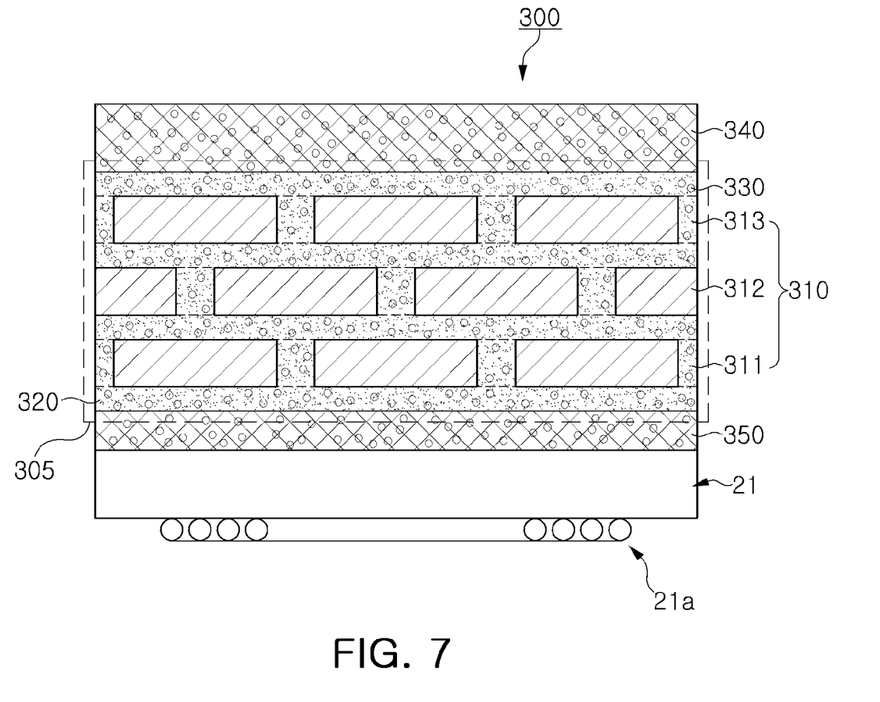

A magnetic field shielding sheet 300 according to an example shown in FIG. 7 includes a magnetic field shielding area 305 including magnetic field shielding layers 311 through 313 (310) and an adhesive layer 320, a plurality of heat radiation fillers 330, a heat radiation layer 340, a double-sided tape 350, or the like. Some of the plurality of heat radiation fillers 330 are included even within the heat radiation layer 340 and the double-sided tape 350. The path to which the heat generated from the coil part 21 is transferred may be continuously formed from the upper surface of the coil part 21 to an upper surface of the heat radiation layer 340 by including some of the plurality of heat radiation fillers 330 even in the heat radiation layer 340 and the double-sided tape 350, thereby further increasing the heat radiation efficiency.

Figure 8:
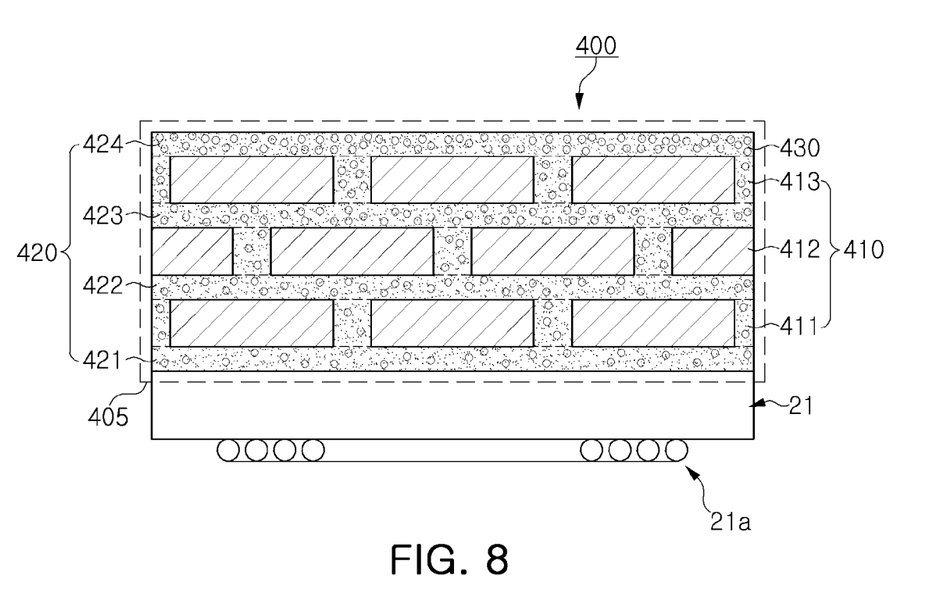
Figure 9:
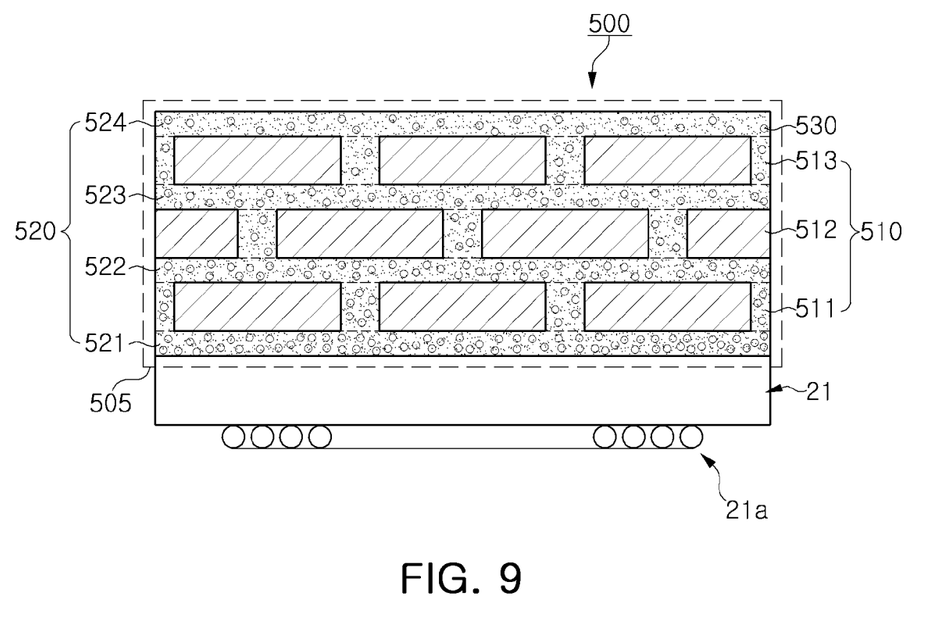

Next, in magnetic field shielding sheets 400 and 500 according to the examples shown in FIGS. 8 and 9, a volume ratio of a plurality of heat radiation fillers 430 and 530 may be changed along the stacked direction. Referring first to FIG. 8, the volume ratio of the plurality of heat radiation fillers 430 gradually increases from an area adjacent to the coil part 21 toward an upper surface 400 of the magnetic field shielding sheet 400. That is, the volume ratio of the plurality of heat radiation fillers 430 is larger the farther it is from the coil part 21. In one example, a volume ratio taken up by the heat radiation filler 430 within a first adhesive layer 421 that is positioned at a bottom layer within the magnetic field shielding sheet 400 is 0.2, and a volume ratio taken up by the heat radiation filler 430 within a second adhesive layer 422 is 0.3. Further, the heat radiation filler 430 within a third adhesive layer 423 may be provided as the volume ratio of 0.5, and the heat radiation filler 430 within a fourth adhesive layer 424 may be provided as the volume ratio of 0.7. In this example, the volume ratio taken up by the heat radiation filler 430 at the whole of the adhesive layer 420 included in the magnetic field shielding area 405 may be limited to a range between 0.05 and 0.8 as described above.

Meanwhile, referring to FIG. 9, the volume ratio taken up by the plurality of heat radiation fillers 530 within adhesive layers 521 through 524 (520) gradually decreases from an area adjacent to the coil part 21 toward an upper surface of the magnetic field shielding sheet 500. That is, the volume ratio of the plurality of heat radiation fillers 530 is smaller the farther it is from the coil part 21. Referring to the example shown in FIG. 9, most heat radiation fillers 530 may be disposed within a first adhesive layer 521 that is positioned at a bottom layer, and the amount of heat radiation fillers 530 may be gradually reduced toward a fourth adhesive layer 524. In the example shown in FIG. 9, the volume ratio taken up by the heat radiation filler 530 at the whole of the adhesive layer 520 included in the magnetic field shielding area 505 may range from 0.05 to 0.8.

According to the examples set forth above, a magnetic field shielding sheet may include the plurality of heat radiation fillers disposed in the magnetic field shielding area, in which the plurality of heat radiation fillers may provide the heat radiation path from the coil part providing the wireless power charging function to increase the heat radiation efficiency of the magnetic field shielding sheet.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A magnetic field shielding sheet, comprising:
    a magnetic field shielding area comprising magnetic field shielding layers, disposed on a surface of a coil part configured to provide a wireless power, to shield a magnetic field generated from the coil part and an adhesive layer bonding the magnetic field shielding layers to each other; and
    heat radiation fillers disposed within the adhesive layer, wherein a volume ratio of the heat radiation fillers within a first portion of the adhesive layer is different from a volume ratio of the heat radiation fillers within a second portion of the adhesive layer farther away from the coil part.

2. The magnetic field shielding sheet of claim 1, wherein a volume ratio taken up by the heat radiation fillers within the adhesive layer ranges from 0.05 to 0.8.

3. The magnetic field shielding sheet of claim 2, wherein the volume ratio of the heat radiation fillers within the second portion of the adhesive layer distal from the coil part is larger than the volume ratio of the heat radiation fillers within the first portion of the adhesive layer closer to the coil part than the first portion.

4. The magnetic field shielding sheet of claim 2, wherein the volume ratio of the heat radiation fillers within the first portion of the adhesive layer adjacent to the coil part is larger than the volume ratio of the heat radiation fillers within the second portion of the adhesive layer farther away from the coil part than the first portion.

5. The magnetic field shielding sheet of claim 1, wherein a diameter of each of the heat radiation fillers ranges from 0.05 μm to 10 μm.

6. The magnetic field shielding sheet of claim 1, further comprising a heat radiation layer disposed on at least one of an upper surface and a lower surface of the magnetic field shielding area.

7. The magnetic field shielding sheet of claim 6, wherein the heat radiation layer comprises different materials from the adhesive layer.

8. The magnetic field shielding sheet of claim 6, wherein a portion of the heat radiation fillers are disposed within the heat radiation layer.

9. The magnetic field shielding sheet of claim 1, wherein the heat radiation filler comprises at least one selected from the group consisting of graphite, graphene, alumina, aluminum nitride, boron nitride, magnesium oxide, silicon carbide, and silicon nitride.

10. The magnetic field shielding sheet of claim 1, wherein the magnetic field shielding layers comprise at least one selected from the group consisting of ferrite, an amorphous metal ribbon, a nano-crystalline ribbon, and a metal polymer sheet.

11. The magnetic field shielding sheet of claim 1, wherein the magnetic field shielding sheets are split into pieces, and the adhesive layer is disposed between a portion of the pieces.

12. A wireless power charging apparatus, comprising:
    a coil part comprising a first surface on which a conductive pattern is disposed and a second surface opposing the first surface;
    a power circuit configured to charge a secondary cell battery by using power induced into the coil part;
    a magnetic field shielding area comprising magnetic field shielding layers, disposed on the second surface, to absorb a magnetic field generated from the conductive pattern and an adhesive layer bonding the magnetic field shielding layers to each other; and
    heat radiation fillers disposed within the adhesive layer, wherein a volume ratio of the heat radiation fillers within a first portion of the adhesive layer is different from a volume ratio of the heat radiation fillers within a second portion of the adhesive layer farther away from the coil part.

13. The wireless power charging apparatus of claim 12, wherein a volume ratio taken up by the heat radiation fillers within the adhesive layer ranges from 0.05 to 0.8.

14. The wireless power charging apparatus of claim 13, wherein the volume ratio of the heat radiation fillers within the second portion of the adhesive layer distal from the coil part is larger than the volume ratio of the heat radiation fillers within the first portion of the adhesive layer closer to the coil part than the first portion.

15. The wireless power charging apparatus of claim 13, wherein the volume ratio of the heat radiation fillers within the first portion of the adhesive layer adjacent to the coil part is larger than the volume ratio of the heat radiation fillers within the second portion of the adhesive layer farther away from the coil part than the first portion.

16. The wireless power charging apparatus of claim 12, further comprising a heat radiation layer disposed between the coil part and the magnetic field shielding area, wherein a thickness of the heat radiation layer ranges from 25% to 200% of that of at least one of the magnetic field shielding layers.

\* \* \* \* \*